Dec. 29, 1959   I. R. BARR   2,918,738
AMPHIBIOUS WALKING VEHICLE
Filed Dec. 10, 1953   4 Sheets-Sheet 1

Dec. 29, 1959     I. R. BARR     2,918,738
AMPHIBIOUS WALKING VEHICLE

Filed Dec. 10, 1953     4 Sheets-Sheet 3

2,918,738

AMPHIBIOUS WALKING VEHICLE

Irwin R. Barr, Kingsville, Md., assignor to Aircraft Armaments, Inc., Baltimore, Md., a corporation of Maryland Application December 10, 1953, Serial No. 397,459

9 Claims. (Cl. 37—80)

This invention relates to vehicles and more particularly to an amphibious walking type vehicle ideally suited for travel over rough terrain and soft ground and which is capable of digging trenches and the like.

An object of this invention is to provide a small, lightweight vehicle particularly adapted for front line military uses such as a mobile machine gun platform and as a mechanical trench digger.

Another object of this invention is to provide a walking type vehicle capable of being propelled on the surface of water.

Another object of this invention is to provide a walking type vehicle having a plurality of telescoping legs wherein the length thereof is varied by fluid pressure means to avoid vertical oscillations or "galloping" of the vehicle when in motion.

Still another object of this invention is to provide a vehicle having propelling means which is dependable in operation and which will allow an arrangement of components resulting in a stable closed-to-the-ground design.

Further and other objects will become apparent from a reading of the following description especially when considered in combination with the accompanying drawing wherein like numerals refer to like parts.

Figure 1:
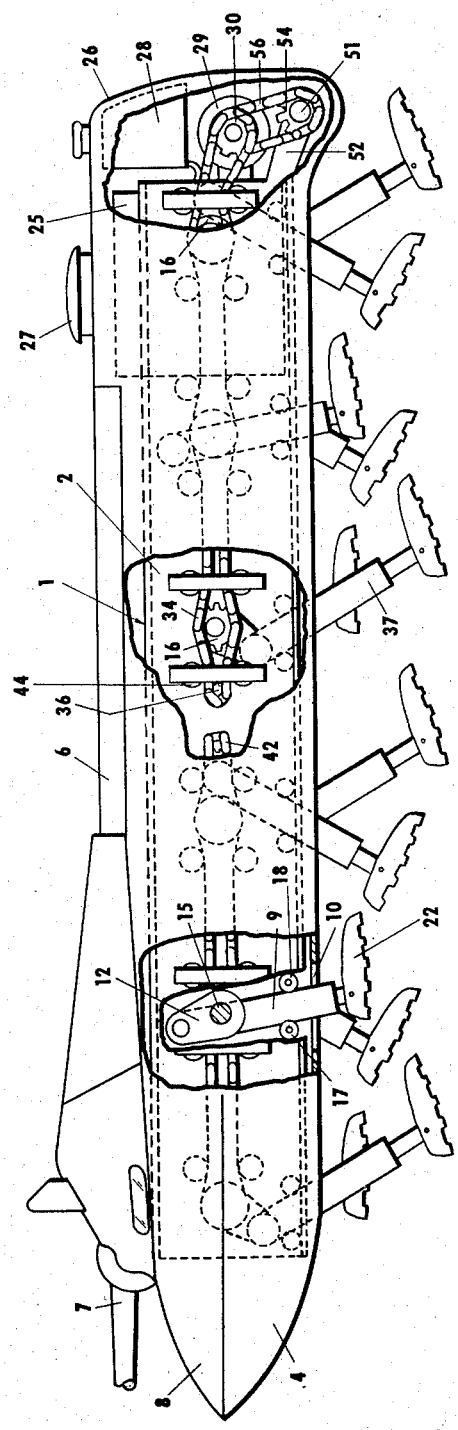
Figure 1 is a fragmentary side view of the vehicle of this invention.

Referring to the drawings, the vehicle including a frame 1 comprising a pair of flanged U beams 2 and 3 longitudinally arranged relative to the vehicle and spaced apart in a generally parallel relationship. A housing 4 forming an enclosure for accommodating an operator 5 is carried by frame 1. Doors 6 are provided on the upper side of housing 4 to provide access to the inside of the vehicle. For use as a military weapons carrier as shown in the drawing, a gun 7 may be mounted on the nose portion 8 of housing 4, for example, for use by the vehicle operator.

Figure 3:
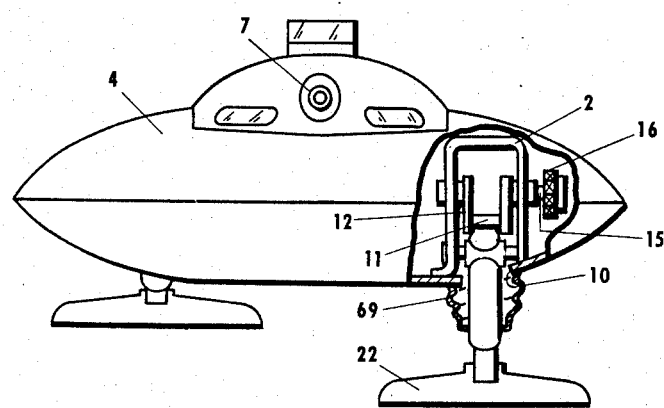
Figure 3 is a fragmentary front view of the vehicle.

Four (4) sets of legs 9, two (2) sets on one side of the vehicle and two sets on the other side are carried by beams 2 and 3 between the walls thereof and project through slotted openings 10 in housing 4 as best shown in Figures 1 and 3. There are three legs to each set, each of which are alike and move in synchronism so that at any given time one leg in each set will make ground contact for supporting the vehicle.

Figure 4:
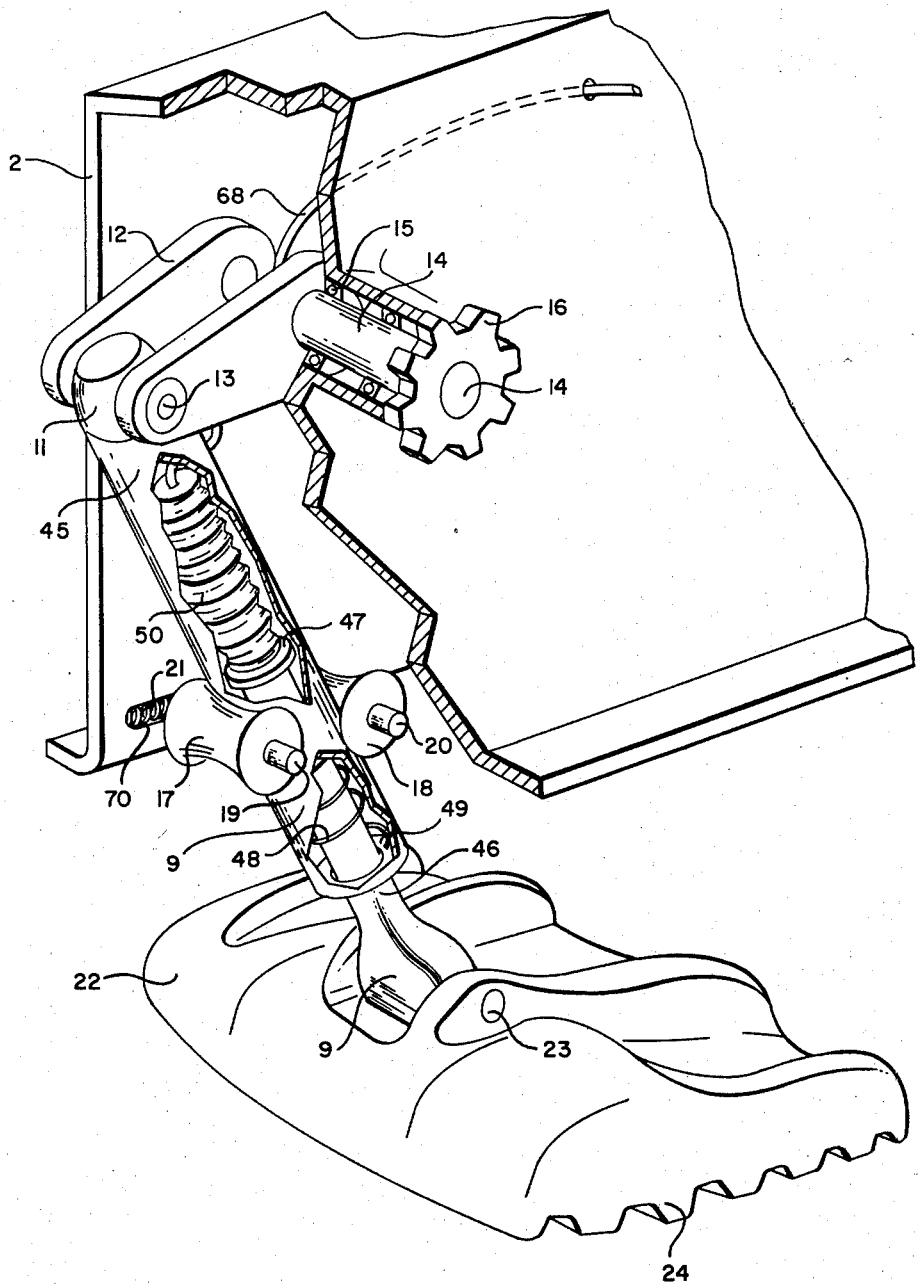
Figure 4 is a fragmentary view of one of the telescoping legs.

As best shown in Figure 4, the upper end 11 of each leg is swingably carried by an eccentric 12 through pin 13. Eccentric 12 is provided with an axle 14 which is rotatably supported by beam 2 or 3 through bearings 15. Leg 9 and eccentric 12 are aligned between the two spaced walls of the beam and arranged so that axle 14 on each eccentric is supported by both beam walls. Axle 14 projects axially beyond support bearings 15 on the outside of frame 1. A sprocket 16 is fixedly carried by axle 14 on the outer end 14' thereof. By driving sprocket 16, eccentric 12 is caused to rotate, effecting reciprocating motion of leg 9. The legs are each restrained against any lateral movement at a point intermediate of the ends thereof by means of a pair of spaced rollers 17 and 18 carried by frame 1 through shafts 19 and 20. Shafts 19 and 20 extend transversely of the beam 2 or 3 and engage slots 70 formed therein allowing rollers 17 and 18 to move relative to one another as required for the unrestrained angular movement of leg 9. A spring 21 is carried within each slot 70 urging the rollers toward one another and in engagement with leg 9. By employing springs of sufficient strength, lateral movement of the legs at the point of contact with rollers 17 and 18 is prevented while allowing the necessary angular and axial movement thereof. The fulcrums provided by rollers 17 and 18 offer only rolling friction against axial movement of the legs, whereby the vehicle will operate efficiently and with little power loss due to friction.

A footlike member 22 is carried by each leg 9 adjacent the free end 9' thereof through pin 23. Members 22 are mounted with a slight overhang rearwardly and are allowed limited swinging movement about pin 23 so as to normally rest in a nose up position due to gravity. For increased traction, the underside of footlike members 22 are corrugated to form gripping lugs 24.

Figure 2:
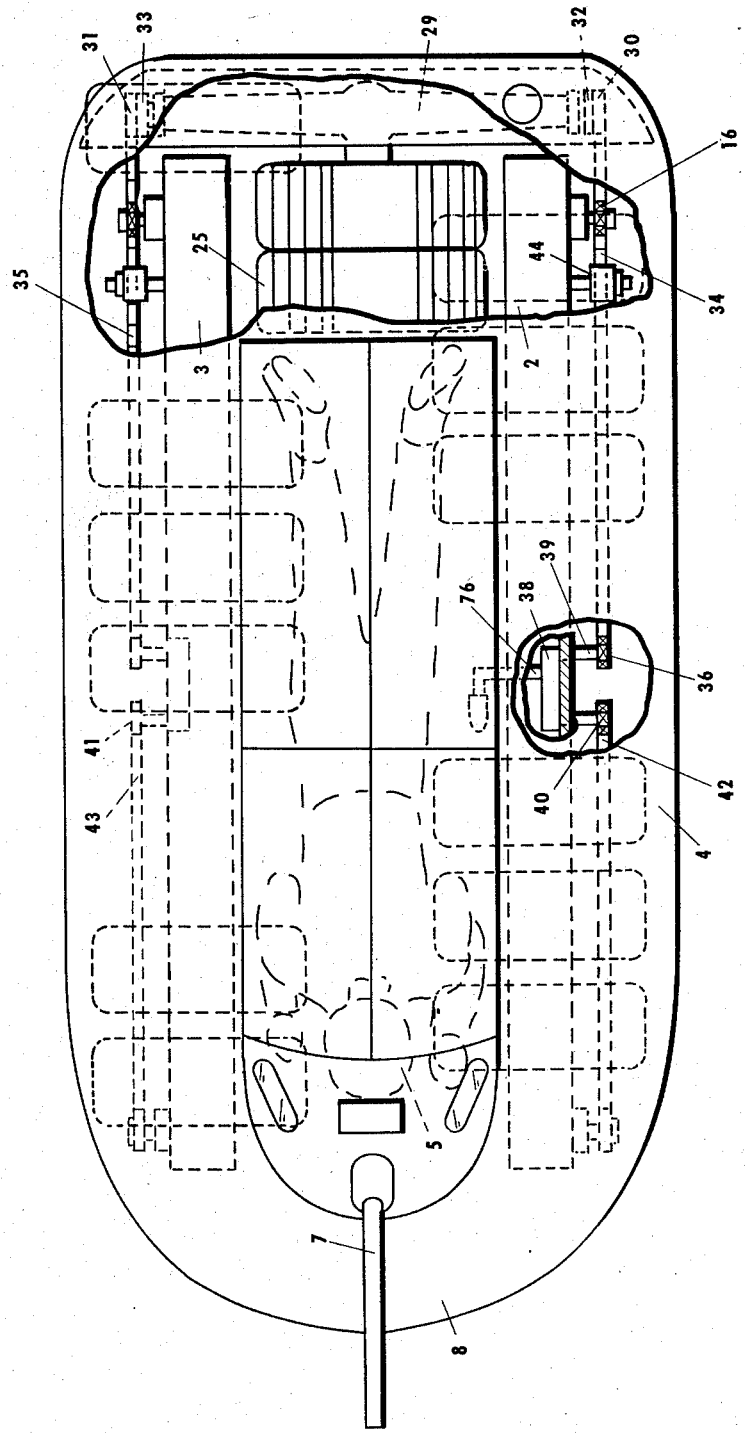
Figure 2 is a fragmentary top view of the vehicle.

Suitable power means such as a conventional gasoline engine 25 is mounted within housing 4 adjacent the aft end 26 between beams 2 and 3 as best shown in Figures 1 and 2. A vent 27 is formed in the upper side of housing 4 to provide a carburetor air inlet for the engine 25. A fuel tank 28 is carried within housing 4 at the extreme aft end thereof adjacent engine 25. A power transmission and differential 29 operatively connects engine 25 with a pair of like leg drive sprockets 30 and 31 aligned with sprockets 16 on either side of frame 1 and with a pair of cam drive sprockets 32 and 33. Leg drive chains 34 and 35 engage drive sprockets 30 and 31 and extend forwardly thereof on the outside of frame 1 and within housing 4 to drivingly engage sprockets 16 associated with the two rear sets of legs. Each chain 34 and 35 also engages a sprocket 36, one on either side of frame 1, located immediately ahead of the front leg 37 of each rear set. Sprocket 36 operatively connects with a reversing transmission 38 through input shaft 39. Transmission 38, carried by frame 1 is provided with a pair of output driving sprockets 40 and 41 on either side of frame 1 which engage a second pair of leg drive chains 42 and 43. Drive chains 42 and 43 connect with sprockets 16 on the forward sets of legs for rotating eccentrics 12 in response to rotation of sprockets 40 and 41. Conventional chain tensioning devices such as spring loaded rollers 44 are employed for eliminating the slack in the drive chains.

Figure 5:
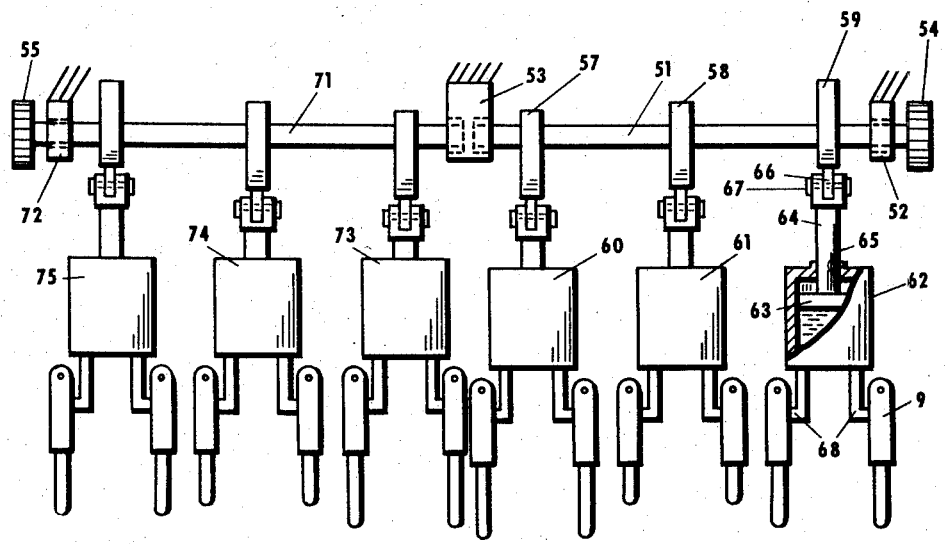
Figure 5 is a view showing schematically the fluid pressure system in the vehicle.

Eccentrics 12 for each set of legs are rotationally arranged 120° apart so that each leg in a set will make ground contact throughout 120° of movement of its associated eccentric. Since the vertical movement of the legs is controlled by the rotating eccentrics, foot-like members 22 will normally take an arcuate path during ground contact causing the vehicle to oscillate vertically or "gallop" as it is propelled. In order to eliminate this undesirable vertical movement means are provided for varying the length of the legs so that substantially linear movement of foot-like members 22 will be made during ground contact. As best shown in Figure 4, each leg 9 comprises a pair of telescoping members 45 and 46. Member 46 is provided with a piston 47 which is slidably received within member 45, allowing only axial movement between the members. A spring 48 is carried within member 45 which acts between piston 47 and an internal abutment 49 formed in the lowermost end of member 45 for urging member 46 and the attached foot-like member 22 upwardly to a minimum leg length position. A bellows type fluid bag 50 is carried within member 45 adjacent the upper end 11 thereof and in contact with piston 47. By controlling the fluid pressure in bag 50, the length of each leg may be varied as desired to eliminate the vertical oscillations in the vehicle when in motion. Obviously, bellows type fluid bag 50 may be replaced by a conventional hydraulic cylinder construction without departing from the teachings of this invention. The purpose of the bellows type bag is to eliminate the necessity for close manufacturing tolerances whereby the legs may be more economically manufactured. One leg of a set moves relative to the other legs in the same set, but in an identical manner and in synchronism with the corresponding leg in the other set on the same side of the vehicle, each pair of such corresponding legs being hereinafter referred to as a group. The corresponding legs on opposite sides of the vehicle do not necessarily move in synchronism because turning is effected by braking action in the transmission and differential 29 to reduce the speed of rotation of either drive sprocket 30 or 31 which results in a corresponding reduction in the speed of the legs on one side of the vehicle. Therefore, there are six groups of two legs each wherein the fluid pressure control requirements are identical. By providing six separate pressure control means, one for each group of legs, the leg length may be properly controlled at all times to cause the foot-like members to move in a path which is linear during ground contact, producing smooth vehicle travel. This pressure control is accomplished as shown in Figures 1 and 5 wherein a pair of opposed shafts 51 and 71 are arranged transversely of frame 1 and carried for independent rotation by suitable brackets 52, 53 and 72 projecting rearwardly from beams 2 and 3. A pair of drive sprockets 54 and 55 are fixedly carried by shafts 51 and 71 respectively, engaging drive chains 56, one for each sprocket 54 and 55, which are driven by cam drive sprockets 32 and 33 on power transmission and differential 29. Cam drive sprockets 32 and 33 are fixed to, and rotate with, their associated leg drive sprockets 30 or 31. The speed ratios for both leg drive sprockets 30 and 31 and cam sprockets 54 and 55 are such that 360° of rotation of eccentrics 12 also results in 360° rotation of shafts 51 and 71. Three cams 57, 58 and 59 are rigidly carried by each shaft 51 and 71 and are of such a shape as to produce the desired telescoping movement of legs 9 by controlling the fluid pressure means described hereinbelow. Fluid cylinders 60, 61, 62, 73, 74 and 75 are carried within the vehicle adjacent cams 57, 58 and 59 on each shaft 51 and 71. Each fluid cylinder, such as cylinder 62, is provided with an axially movable piston 63 for compressing a suitable fluid such as air carried within the cylinder. Piston 63 connects with a piston rod 64 which extends axially through an aperture 65 in cylinder 62. Piston rod 64 rotatably carries a roller 66 through pin 67 for making rolling contact with cam 59. As shaft 51 is rotated, cam 59 moves piston 63 axially within cylinder 62 to produce the proper pressure to linearize the path of the foot-like members 22 during ground contact. Each fluid cylinder 60, 61, 62, 73, 74 and 75 connects with one of the groups of legs through flexible fluid pressure lines 68 as schematically shown in Figure 5. As shown in Figure 4, lines 68 feed directly into the bellows type fluid bag 50 carried with member 45 of each leg 9. By pressurizing the bags, force is applied to pistons 47 causing the legs to increase in length in opposition to the action of springs 48. The length of each leg 9 will be dependent upon the magnitude of the fluid pressure applied to its associated bag 50. The cams are shaped to provide a low fluid pressure when foot-like members 22 are off the ground, allowing springs 48 to move the bags into the minimum length position for maximum ground clearance. During the rotational movement of eccentrics 12 through the lower 120° segment, legs 9 make ground contact through foot-like members 22. Fluid pressure control during this period is most important, for the length of the legs must be varied to linearize the foot path and provide smooth vehicle travel. The exact shape of the cams required to produce a linear foot path is dictated by several variables but mainly by the deflection characteristics of springs 48 and by the amount of angular movement of the legs. The proper cam shape may be established by conventional mathematical analysis and by test.

The vehicle is made amphibious, as indicated in Figure 3, by having housing 4 arranged to completely enclose the frame and operating mechanism with only the legs projecting through slotted openings 10 on the underside of the housing. The slotted openings are each sealed by a conventional flexible plastic boot 69 which is secured to housing 4 adjacent opening 19 and to leg 9. As the vehicle floats on the surface of the water, the legs produce a propelling force when actuated.

Operation of the vehicle is believed obvious from a reading of the foregoing description. The operator, lying in a prone position within housing 4, controls the power means and transmission which actuate the legs. Leg drive sprockets 30 and 31 are driven by engine 25 through transmission and differential 29. Drive chains 34 and 35 transmit the rotation of sprockets 30 and 31 to sprockets 16 on eccentrics 12 for the two rear sets of legs. Chains 34 and 35 also transmit power to chains 42 and 43 through reversing transmission 38 to cause rotation of sprockets 16 associated with the two forward sets of legs. Rotation of all eccentrics 12 in the same direction causes legs 9 to move in a walking manner to propel the vehicle. Simultaneously, with the rotation of eccentrics 12, cams 57, 58 and 59 on each shaft 51 and 71 are rotated by cam drive sprockets 32 and 33 through chains 56 to control the fluid pressure in the six groups of legs to avoid vertical oscillations of the vehicle. This is accomplished by timely varying the length of the legs to linearize the foot path during ground contact. The fluid pressure for the legs not making ground contact is reduced sufficiently, by cam action, to allow springs 48 on each leg 9 to fully retract foot-like members 22 for maximum ground clearance.

Turning of the vehicle is accomplished by braking the appropriate leg drive sprocket 30 or 31 and its associated cam drive sprocket 54 or 55 to reduce or stop the rotation thereof while allowing the other leg and cam drive sprockets to continue rotation. A pivot turn may be made with the vehicle by stopping the movement of the legs on one side while allowing the others to continue the walking movement.

The vehicle may be used for digging trenches and the like by simply actuating reversing transmission 38 by manual operation of a suitable control lever 76 to cause eccentrics 12 associated with the two forward sets of legs to rotate in a direction opposite to the direction of rotation of the eccentrics associated with the two rear sets of legs. Foot-like members 22 are thereby caused to move in opposition, producing only a digging action. By employing rather broad feet which nearly cover the entire area under the vehicle, a trench may be dug quickly and with but little sidewise vehicle movement.

The drive arrangement for the legs allows the design of a relatively lightweight structure having a specific gravity sufficiently low as to permit the vehicle to float on the surface of water. Foot-like members 22 being swingably carried by legs 9 for limited movement and having an overhang to the rear produce a net force propelling the vehicle forward in water by rotating eccentrices 12. As the feet move rearwardly relative to the vehicle housing a large drag is created due to the feet being forced into an extreme nose-up position while forward foot movement creates only a small drag with the feet trailing in the water.

The fluid pressure system employed for varying the length of legs 9 inherently provides shock absorption and stabilization means for the vehicle when traveling over rough ground. If a foot steps on a hump, for example, the corresponding leg in the other group on the same side of the vehicle will increase in length in order to balance the fluid pressure in both the legs. This is so because corresponding legs on the same side of the vehicle connect with the same fluid pressure cylinder and are therefore in fluid communication with each other. As a result, the vehicle will roll gently about its longitudinal axis in absorbing shock loads. By employing such a system, the normal requirement for spring suspension of the vehicle frame is eliminated.

It is to be understood that certain alterations, modifications and substitutions may be made to the instant disclosure without departing from the spirit and scope of the invention as defined by the appended claims.

I claim:

1. An amphibious vehicle particularly suited for military uses in carrying weapons, digging trenches and the like comprising, a frame, a housing carried by said frame and forming an enclosure for accommodating an operator, drive means carried by said frame, a plurality of front and rear eccentrics rotatably carried by said frame and operatively connecting with said drive means, a plurality of sets of telescoping legs each connecting at one end with one of said eccentrics for reciprocating movement in response to rotational movement of the eccentrics, means carried by said frame providing a fulcrum for each of said legs intermediate of the ends thereof for restraining said legs against horizontal lateral movement with respect to the direction of travel of said vehicle only, foot-like members carried by the free ends of said legs for propelling said vehicle upon rotation of said eccentrics, each said leg including fluid pressure means for controlling the telescoping movement thereof, cam means carried by said frame and operatively connecting with said drive means for regulating said fluid pressure means to linearize the path of said foot-like members throughout a portion of the movement of said legs, and means connecting with said drive means for reversing the rotational direction of said front eccentrics relative to said rear eccentrics for causing certain of said foot-like members to move in opposition to other of said foot-like members for digging.

2. A vehicle comprising, a frame, drive means carried by said frame, a plurality of front and rear rotatable eccentrics carried by said frame and operatively connecting with said drive means, a plurality of legs each connecting with one of said eccentrics for reciprocating movement in response to rotational movement of the eccentrics, means carried by said frame providing a fulcrum for each of said legs intermediate of the ends thereof for restraining said legs against horizontal lateral movement with respect to the direction of travel of said vehicle only, foot-like members carried by the free end of each of said legs for propelling said vehicle upon rotation of said eccentrics, each said leg including fluid pressure means for varying the length thereof, cam means carried by said frame and controlled by said power means for regulating said fluid pressure means, and means for reversing the rotational direction of said front eccentrics relative to said rear eccentrics for causing certain of said foot-like members to move in opposition to other of said foot-like members for digging.

3. A vehicle comprising, a frame, a source of power carried by said frame, a plurality of rotatable eccentrics carried by said frame and operatively connecting with said source of power, a plurality of legs each connecting with one of said eccentrics for reciprocating movement in response to rotational movement of the eccentrics, means carried by said frame providing a fulcrum for each of said legs intermediate of the ends thereof for restraining said legs against horizontal lateral movement with respect to the direction of travel of said vehicle only, foot-like members carried by the free ends of said legs for propelling said vehicle upon rotation of said eccentrics, each said leg including actuating means for varying the length thereof, and cam means carried by said frame and controlled by said source of power for regulating said actuating means to linearize the path of said foot-like members throughout a portion of the movement of said legs.

4. A vehicle comprising, a frame, drive means carried by said frame, a plurality of eccentrics rotatably carried by said frame and connecting with said drive means, a plurality of sets of telescoping legs each connecting with one of said eccentrics for reciprocating movement in response to rotational movement of the eccentrics, means carried by said frame providing a fulcrum for each of said legs intermediate of the ends thereof for restraining said legs against horizontal lateral movement with respect to the direction of travel of said vehicle only, foot-like members carried by the free ends of said legs for propelling said vehicle upon rotation of said eccentrics, each said leg including fluid pressure means for controlling the telescoping movement thereof and cam means carried by said frame and controlled by said drive means for regulating said fluid pressure means to linearize the path of said foot-like members throughout a portion of the movement of said legs.

5. A vehicle comprising, a frame, a source of power carried by said frame, a plurality of sets of eccentrics rotatably carried by said frame, force transmitting means operatively connecting said source of power with said sets of eccentrics for causing the latter to rotate, a plurality of legs each connecting at one end to one of said eccentrics for reciprocating motion in response to rotational movement of the eccentrics, means carried by said frame and providing a fulcrum for each of said legs intermediate of the ends thereof for restraining said legs against horizontal lateral movement with respect to the direction of travel of said vehicle only, foot-like members carried by the free ends of said legs for propelling said vehicle upon rotation of said eccentrics, and means connecting with said force transmitting means for reversing the direction of rotation of certain of said sets of eccentrics relative to the direction of rotation of other of said sets of eccentrics whereby said foot-like members are caused to work in opposition for digging trenches or the like.

6. A walking type vehicle comprising, a pair of beams spaced apart in a generally parallel relationship forming a frame, power means carried by said frame between said beams, a plurality of eccentrics rotatably carried by said beams and operatively connecting with said power means, a plurality of telescoping legs each swingably carried by one of said eccentrics for reciprocating motion in response to rotational movement of said eccentrics, means carried by said frame and engaging said legs intermediate of the ends thereof and providing a fulcrum restraining said legs against lateral movement with respect to the direction of travel of said vehicle only, foot-like members carried by the free ends of said legs for engaging the ground and propelling said vehicle, and means carried by said frame and connecting with said legs for controlling the telescoping movement thereof whereby to linearize the path of said foot-like members throughout a portion of the movement thereof.

7. A walking type vehicle capable of digging trenches and the like comprising, a frame, a housing carried by said frame and forming an enclosure for accommodating an operator, drive means carried by said frame within said housing, a plurality of sets of legs carried by said frame and operatively connecting with said drive means, foot-like members pivotally carried by said legs for limited angular movement, said foot-like members having gripping lugs formed thereon for engaging the ground and propelling said vehicle upon actuation of said legs, and transmission means connecting with said drive means for reversing the direction of movement of certain of said sets of legs with respect to the direction of movement of other of said sets of legs whereby said foot-like members are caused to move in opposition for digging.

8. A walking type vehicle comprising, a frame, a housing carried by said frame and forming an enclosure for accommodating an operator, drive means carried by said frame within said housing, a plurality of sets of telescoping legs carried by said frame and operatively connecting with said drive means, foot-like members swingably carried by said legs adjacent one end thereof for propelling said vehicle, fluid pressure means connecting with said legs for controlling the telescoping movement thereof, and cam means carried by said frame and operatively connecting with said drive means and with said fluid pressure means for actuating the latter whereby to modify the path of said foot-like members so as to avoid vertical oscillations of said frame when being propelled.

9. The combination, with a vehicle having power means, of a plurality of sets of leg means, each set having at least one leg; means mounting each leg for eccentric movement with respect to said vehicle to propel the same thereby; each leg comprising two members telescopically mounted together; means interconnecting a leg of one set with a leg of another set to form a group of legs to cause the same to move in synchronism; resilient means between the members of each leg to urge the same together for resiliently maintaining a minimum leg length; and control means operatively associated with said power means and one member of each leg for controlling the relative position of said one member with respect to the other against the action of said resilient means, whereby vertical movement of said vehicle during its propulsion may be controlled.

References Cited in the file of this patent

UNITED STATES PATENTS

| | | |
|---|---|---|
| 278,822 | Richardson | June 5, 1883 |
| 455,240 | McMurray | June 30, 1891 |
| 1,155,975 | Van Antwerp | Oct. 5, 1915 |
| 1,229,954 | Hedges | June 12, 1917 |
| 1,750,586 | Field et al. | Mar. 11, 1930 |
| 2,491,064 | Urschel | Dec. 13, 1949 |